UNITED STATES PATENT OFFICE.

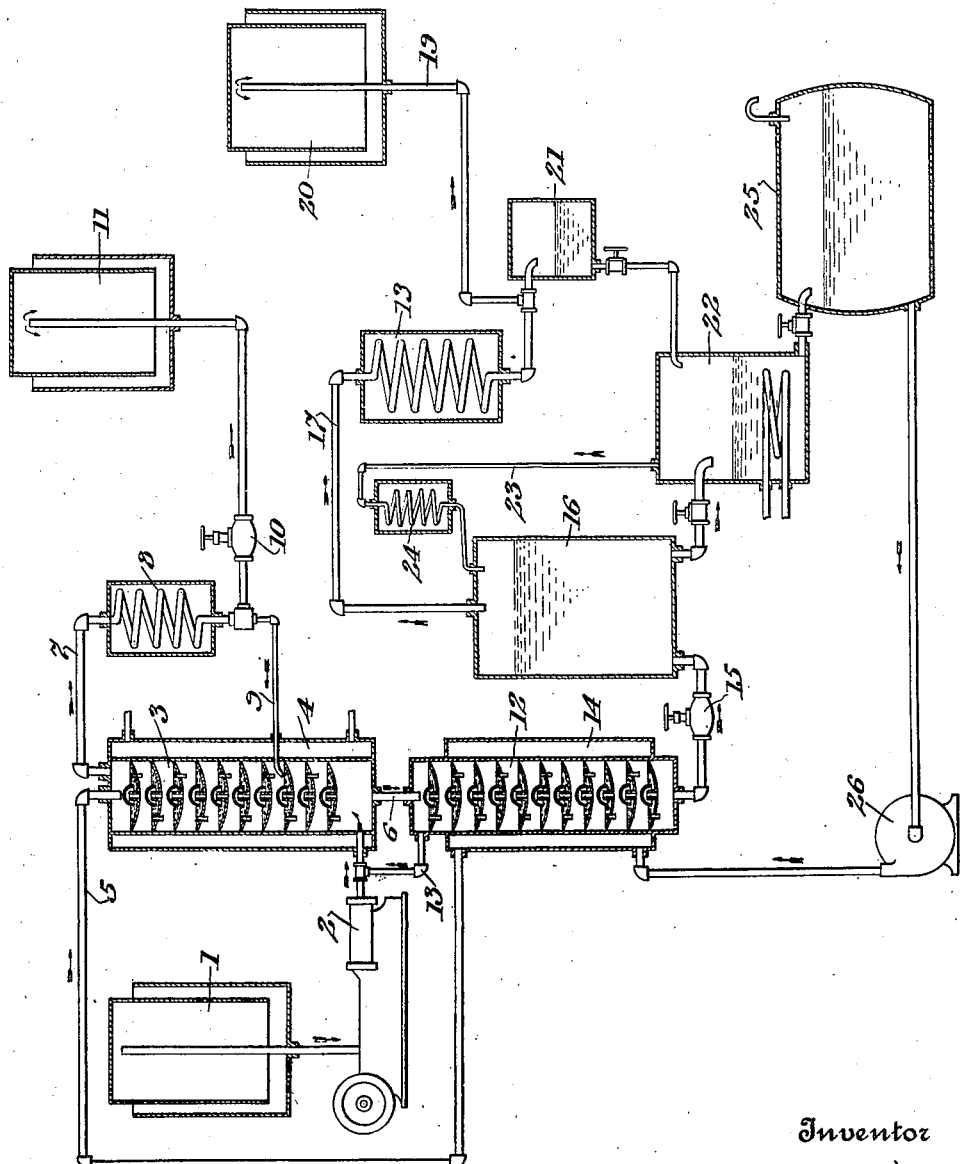

GEORGE O. CURME, JR., OF PITTSBURGH, PENNSYLVANIA, ASSIGNOR TO UNION CARBIDE COMPANY, OF NEW YORK, N. Y., A CORPORATION OF VIRGINIA.

TREATING GASEOUS HYDROCARBON MIXTURES.

1,422,182.   Specification of Letters Patent.   Patented July 11, 1922.

Application filed June 5, 1919. Serial No. 302,040.

*To all whom it may concern:*

Be it known that I, GEORGE O. CURME, Jr., a citizen of the United States, residing at Pittsburgh, in the county of Allegheny and State of Pennsylvania, have invented certain new and useful Improvements in Treating Gaseous Hydrocarbon Mixtures, of which the following is a specification.

This invention is a process intended more especially for the treatment of gaseous mixtures containing acetylene, with the objects of effecting a substantially complete separation of the acetylene from the gases accompanying it in the original mixture and of isolating it in a practically pure state. According to the invention I accomplish this result by utilizing in a special way the known solvent power, for acetylene, of such organic solvents as acetone, acetaldehyde, etc. Although I will describe my invention with particular reference to the recovery of acetylene, I desire it to be understood that it is directly applicable to the separation and recovery, from gaseous mixtures, of other hydrocarbon gases which have a relatively high degree of solubility in such organic liquids as are mentioned above. Among such gases ethylene and propylene may be mentioned, and all such gases are collectively designated herein as relatively soluble gaseous hydrocarbons.

For a full understanding of the invention I will describe it in a preferred illustrative embodiment by which acetylene is separated and recovered in a state of substantial purity from a gaseous mixture containing also hydrogen, ethylene, methane and other hydrocarbons, referring to the accompanying drawing in which the figure is a diagrammatic representation of one system of apparatus for use in carrying out my process.

In said drawing 1 represents a holder for the crude gas from any suitable source of supply. For example a gaseous mixture of this type may be prepared by the electrothermic decomposition of liquid hydrocarbons as disclosed in my copending application Serial No. 179,760½, filed July 20, 1915. 2 is a gas compressor, and 3 an absorption column which is preferably provided with cooling or refrigerating means indicated as the jacket 4. The column is illustrated as of the common plate and bell type, the acetone or other solvent liquid being introduced at the top through pipe 5, flowing downwardly through the system in contact with the countercurrent of gas, and being discharged at the bottom through pipe 6. The gaseous hydrocarbon mixture is delivered by the compressor 2 at the bottom of the column, flows upwardly therethrough, and thence through pipe 7 to a cooling coil 8, from which any acetone which is condensed may be returned by pipe 9 to the absorption column. Thence the residual gases, freed from acetylene, flow through a reducing valve 10 to the gas holder 11.

In order to increase the solubility of the gas in the liquid flowing through the column 3 the latter is maintained at a temperature considerably below room temperature and preferably at about $-30°$ C. For the same purpose a substantial superatmospheric pressure is maintained within the column, amounting preferably to several atmospheres. Under these conditions of low temperature and high pressure the more soluble gas or gases, typified in this case by acetylene, are quickly absorbed; and by a proper adjustment as between the volumes and rates of flow of the solvent and the gas an effluent gas mixture wholly free from acetylene is readily obtained. This is highly important in the case of acetylene for the reason that even minute proportions of this gas may render unsafe the application to the effluent mixture of the known processes of fractional liquefaction. By operating in counterflow as described above, at low temperatures and at superatmospheric pressures, it has been found practicable to reduce the acetylene content of the effluent gases to less than one part in one million.

The acetone or other solvent flowing from the column 3 is heavily charged with acetylene, together with smaller percentages of the less soluble gaseous components of the original mixture. This solution flows directly to a purifying column 12 which may have the same general construction as the absorbing column 3. The purifying column 12 has free gas connection with the absorbing column 3 through the conduit 13, so that the superatmospheric pressure is uniform throughout this part of the system. The temperature of the solvent progressively rises however in its downward passage through the tower 12, owing to the absorption of heat from the atmosphere, or, preferably, from the solvent, which may be caused, in its passage to the absorption column, to traverse the jacket 14 surrounding the purifying column. In this way a certain economy is effected by a heat interchange between the inflowing and outflowing portions of the solvent liquid.

In the purifying column the gases tend to escape by bubbling out from the solvent in proportion as the temperature of the latter rises; and since acetylene which is the most soluble component of the gas mixture, greatly predominates in the solution, it is easily possible so to control the operation and the rate of flow of the solution that the whole of the less soluble gases will be eliminated from the solvent, together with a minor proportion only of the acetylene. The gases thus eliminated pass directly to the absorption tower, where the whole of the acetylene together with a certain proportion of the less soluble gases, is caught and returned, the unabsorbed gases freed from acetylene passing to the gas-holder 11. The operation is so controlled that the solvent, charged with acetylene, but practically free from other gases, flows through the reducing valve 15 into the expansion chamber 16. At this point the pressure is reduced, preferably approximately to that of the atmosphere, and the acetylene is rapidly evolved from the solution.

It will be noted that the arrangement of the purifying column is such that the last portions of the acetylene to be evolved (being therefore highest in purity) bubble through the whole of the solvent containing less pure acetylene in solution, whereby the "blowing-out" effect of the acetylene is utilized to the maximum extent.

The acetylene evolved in the expansion tank 16 flows through pipe 17 to a refrigerating condenser 18, where the entrained solvent liquid is separated; thence by pipe 19 to the acetylene gas holder 20.

The acetone or other solvent remaining in the expansion tank 16, as well as that flowing from the condenser 18 into the collecting tank 21 contains residual dissolved acetylene. In order to free it therefrom it may be delivered to a still 22 where a small portion of the liquid, together with the whole of the absorbed gas is fractioned off, the vapors passing through condenser 24 to the expansion tank 16. The purified solvent is conveyed to the storage tank 25, whence it may be returned through pump 26 to the circulating system.

As stated above my invention is not limited to the separation and recovery of acetylene from gaseous mixtures, since it is clearly applicable to the separation and recovery, from any mixture of gaseous hydrocarbons, of any component or mixture of components having a decidedly higher degree of solubility in the particular solvent chosen. Thus, as already stated, it may be applied to the recovery of ethylene or propylene from their mixtures with hydrogen, methane or other less soluble gases. Where several gases of relatively high solubility are present in a complex mixture with less soluble gases they may be separated together, and later parted from each other by any appropriate method. Similarly the invention may be applied in such manner as to separate and recover components of gas mixtures in the order of their solubility in the same or different solvents. For example, in the case of a mixture containing both acetylene and ethylene in conjunction with gases of relatively low solubility, the acetylene may first be separated and recovered in the manner above fully described, and the effluent acetylene-free gas mixture may then be treated in the same or similar apparatus for the separation and recovery of ethylene, the rate of flow of the solvent through the system being adjusted in each case with reference to the particular result to be attained.

It will be readily understood by those skilled in this art that the operation may be variously modified without departing from the spirit of my invention. For example in the embodiment of the invention above described the pressure is maintained uniform throughout the absorbing and purifying columns, while the temperature gradually rises as the solvent traverses the purifying column, the effect being to progressively reduce the solvent power of the liquid to a degree sufficient for the separation therefrom of the less soluble gases. A like result may be secured by a progressive reduction of the pressure through the purifying system; or if desired the temperature and pressure may be conjointly varied in the appropriate sense. It is necessary only that provision be made for progressively reducing the solubility of the gas in the solvent in such manner and to such extent as to accomplish the result sought.

What I claim is:—

1. Process of separating and recovering a relatively soluble component from a gaseous hydrocarbon mixture, comprising compressing the mixture, passing the compressed mixture in contact with a suitable solvent maintained at a temperature below atmospheric, drawing off the gases from which the soluble component has been removed, progressively reducing the solvent power of the liquid to separate therefrom the less soluble gases, returning the gases thereby evolved into contact with portions of liquid having progressively increasing solvent power, and finally to the absorption system, releasing the pressure from the liquid containing the relatively soluble component, and separately recovering said component.

2. Process of separating and recovering a relatively soluble component from a gaseous hydrocarbon mixture, comprising subjecting said mixture under pressure to contact with a solvent liquid maintained at a temperature below atmospheric, progressively reducing the solvent power of the liquid by raising the temperature thereof to separate therefrom the less soluble gases, returning the gases thereby evolved to the absorption system, releasing the pressure from the liquid containing the relatively soluble component, and separately recovering said component.

In testimony whereof. I affix my signature.

GEORGE O. CURME, Jr.